United States Patent [19]

Trammell, Jr. et al.

[11] 4,241,298

[45] Dec. 23, 1980

[54] SPEED CONTROL SWITCH

[75] Inventors: Harold L. Trammell, Jr., Hurst; Jerry W. Swafford, Dallas, both of Tex.

[73] Assignee: Teccor Electronics, Inc., Irving, Tex.

[21] Appl. No.: 5,329

[22] Filed: Jan. 22, 1979

[51] Int. Cl.³ .................................................. H02P 5/16
[52] U.S. Cl. .................................... 318/17; 200/1 A; 200/16 C; 200/157; 318/345 D; 318/345 H; 338/309
[58] Field of Search ................ 318/345 D, 345 H, 17; 200/16 C, 1 A, 157, 239, 241, 243, 252, 260; 310/50; 308/308, 309, 200

[56] References Cited

U.S. PATENT DOCUMENTS

| | | | |
|---|---|---|---|
| 2,095,176 | 10/1937 | Douglas | 200/68 |
| 3,422,386 | 1/1969 | Helgeland | 338/309 |
| 3,546,556 | 12/1970 | Benkert et al. | 310/50 |
| 3,573,703 | 4/1971 | Burks et al. | 338/309 |
| 3,637,967 | 1/1972 | Braun | 200/157 |
| 3,745,286 | 7/1973 | Sahrbacker | 200/157 |
| 3,761,788 | 9/1973 | Matthews et al. | 310/50 |
| 3,886,340 | 5/1975 | Bittel | 200/157 |
| 3,947,801 | 3/1976 | Bube | 338/308 |
| 4,072,834 | 2/1978 | Godfrey | 200/16 C |

*Primary Examiner*—David Smith, Jr.
*Attorney, Agent, or Firm*—Hubbard, Thurman, Turner, Tucker & Glaser

[57] ABSTRACT

An improved compact electronic switch for controlling an electric motor comprising a housing into which a trigger actuator reciprocates for selecting motor speed and a reversing switch mounted on the housing and interlocked with the trigger actuator for selecting motor direction. Improvements include; an improved switch contact arrangement which reduces arcing on switching from full power to variable power motor control, an improved printed variable resistor for the electronic speed control circuitry, and an improved and simplified reversing switch unit.

11 Claims, 7 Drawing Figures

SPEED CONTROL SWITCH

BACKGROUND OF THE INVENTION

This invention relates to speed control switches for use with portable electric motor-driven tools and more particularly to improvements in such speed control switches.

A large number of patents have been granted for various speed control switches and for the various improvements in parts of such switches. U.S. Pat. No. 3,467,801 issued to Matthews on Sept. 16, 1969 and No. 3,691,322 also issued to Matthews on Sept. 12, 1972, both disclose reversing switches intended for use with motor speed controls of the type with which the present invention is concerned. U.S. Pat. No. 3,415,966 issued to Matthews on Dec. 10, 1968, discloses an improved bridge contactor for use with such motor speed controls. U.S. Pat. No. 3,761,788 issued to Matthews et al, on Sept. 25, 1973, discloses an electronic switch module generally of the thick film hybrid circuit type in which resistance elements are printed onto a surface of ceramic housing forming half of the switch module. U.S. Pat. No. 3,886,340 issued to Bittel on May 27, 1975, discloses an arrangement for positioning a switch module in a housing to help align the variable speed circuitry with the trigger actuator of the speed control unit.

Each of the above listed patents represents an attempt to solve various problems which have been encountered in providing low cost, reliable, variable speed controls for electric motor-driven tools. For example, the patents dealing with reversing switches both illustrate the need for such switches and the complexity of devices which have been previously used in attempts to make such devices small enough to fit within the housing of the motor-driven tools. It can be seen that there is still a need for smaller less complicated and more reliable reversing switches for this application.

The above-referenced U.S. Pat. No. 3,415,966 illustrates a reliability problem in the mechanical switch part of these devices. The contactor arrangement taught by that patent includes a central caming projection which lifts up one end of the bridging contactor in breaking the electrical contact and prevents the smearing of plastic material onto the stationary contact when contact is made. In addition, a groove is provided in the contact face of the bridge contactor which is said to aid in removal or elimination of contamination from the stationary contact surface. Such contamination can prevent the making of a good contact and thereby cause the switch to over-heat or prevent the motor from operating. In addition, the groove in the contact face is said to aid in the extinction of arcs which occur when the switch contact is broken. This arcing is known to have a generally destructive effect on all parts of the switch. Due primarily to the arcing damage, most commercial devices when tested on automated life test equipment driving an actual motor load fail in the range of ten to fifteen thousand operating cycles. Occasionally such devices may provide up to 50,000 cycles of operation prior to failure. Thus, if can be seen that further improvement to the switch contact arrangement, which would reduce contact damage from either build-up of contaminants or arcing, would be desirable and would lengthen the lifetime of the device.

This arcing problem has been found to be a particular problem in the common half-wave control variable speed circuit devices such as that disclosed in the above-referenced U.S. Pat. No. 3,761,788. The half-wave speed control devices employ a silicon controlled rectifier instead of a bi-directional device and thereby can provide variable voltage outputs only in the nominal range of zero volts up to one half of the power line voltage. When the trigger actuator of such a device is fully depressed, the mechanical switch contactor by-passes the electronic circuitry and connects full voltage across the motor thereby increasing the supply voltage from one half to full value. When the trigger actuator is released, the voltage therefore drops from a full line voltage to one half value at the time a mechanical switch contact is broken. It is well known that the inductance of a motor essentially always causes an arc to occur upon the breaking of that switch contact. Reduction of arcing caused in this manner would improve the lifetime of this type of relatively inexpensive half-wave motor speed control circuitry.

It has also been found difficult, in actual practice, to provide reproducable trigger actuated motor speed control devices in the sense of providing particular output voltages and resulting motor speeds for given trigger actuator positions. The above-referenced U.S. Pat. No. 3,886,340 illustrates this problem and an attempt to solve it. The variable speed circuitry of the speed control switch provides an output voltage which is proportional to the value of a variable resistance. The resistor value is controlled by the position of a sliding contactor which is linked to the trigger actuator. It is desirable that the variable resistance be accurately positioned relative to the trigger actuator so that a given actuator position will always provide a particular output voltage and resulting motor speed. This positioning has been found to be difficult and as a result various devices provide different turn-on speeds. This turn-on speed is related to the output voltage of the device at the time that the mechanical switch contacts make the connection of the load motor to the variable speed circuitry. The solution taught by the Bittel Patent is to provide projections in the unit housing which mate with portions of the circuitry module to hold the two in a fixed relative position. It can be seen that other sources of misalignment, such as the exact position of the printed resistors on the substrate, will still cause variations in turn-on speed, etc. . . . from unit to unit.

SUMMARY OF THE INVENTION

Accordingly, an object of the present invention is to provide an improved speed control switch for use with electric motor-driven tools.

Another object of the present invention is to provide a speed control switch having a mechanical contact arrangement which eliminates or reduces arcing damage.

Yet another object of the present invention is to provide improved speed control switch circuitry having reproducable and reliable turn-on speed characteristics.

Another object of the present invention is to provide an optimum reversing switch for use with variable speed control switch circuitry.

An improved speed control switch according to the present invention includes a housing into which a trigger actuator reciprocates and which contains a mechanical switch arrangement and a variable speed control electronic module. In a preferred form the housing has connected to it an optimum reversing switch which interlocks with the trigger actuator. The mechanical switch is improved by providing contact surfaces on two stationary switch contacts which are sloped relative to the direction of motion of a bridge contactor and are sloped at approximately 90 degrees relative to each other. The bride contactor has an improved contact arrangement for providing simultaneous tangential contact to the two sloped contact surfaces and thereby providing essentially normal lift-off in breaking the contacts. The fixed contact at which arcing normally occurs is positioned so that the moving bridging contact does not make or break contact at an edge thereof. The moving contactor is arranged so that its surface which touches this fixed contact does not touch the other contact in any trigger actuator position. The preferred electronic speed control circuitry includes an improved printed variable resistor having dead zones at each end and means for simulating wiper contact during initial resistor trimming and for providing linear speed control.

BRIEF DESCRIPTION OF THE DRAWINGS

The present invention may be better understood by reading the following detailed description of the preferred embodiment with reference to the accompanying drawings wherein.

DESCRIPTION OF THE PREFERRED EMBODIMENT

Figure 1:
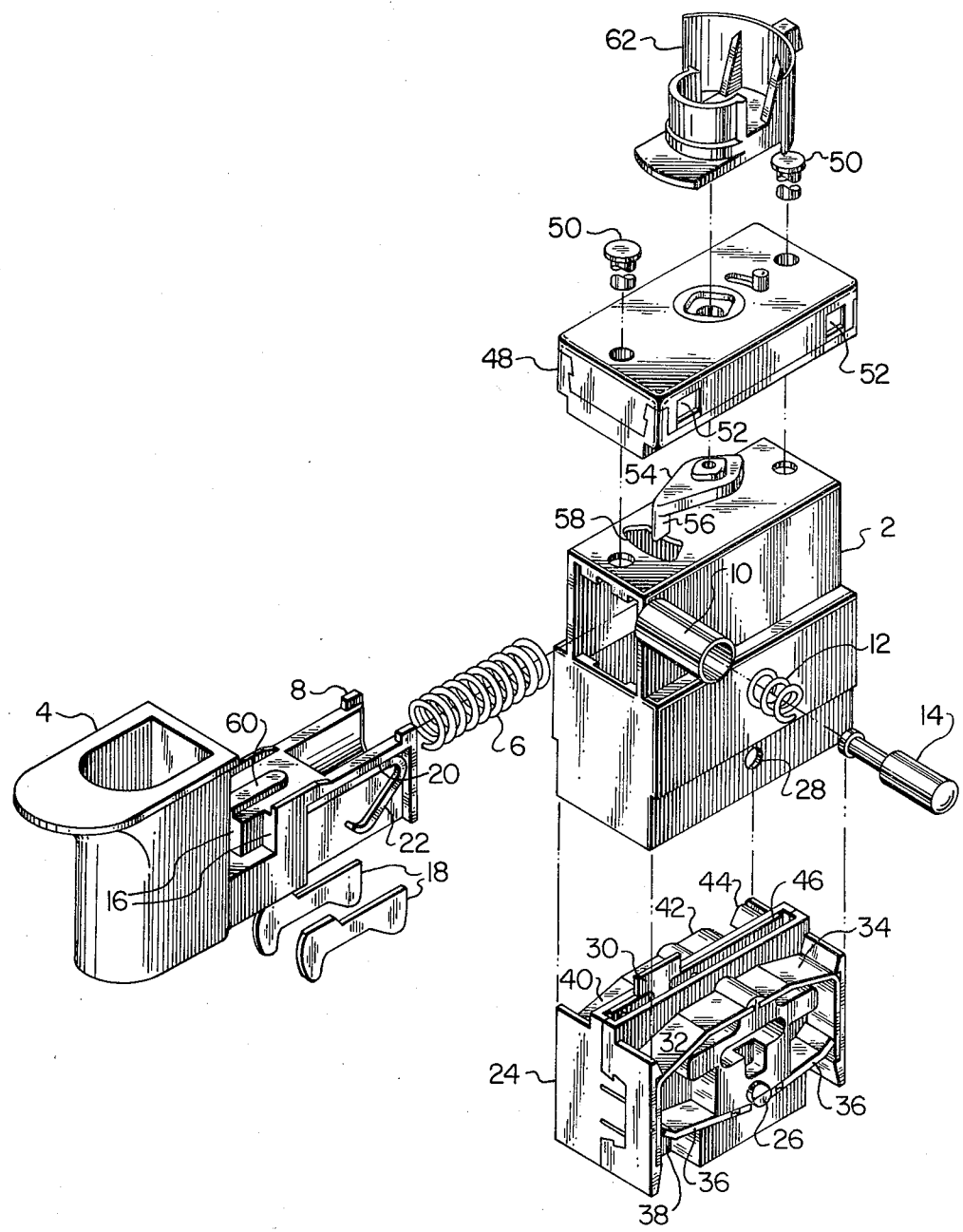
FIG. 1 is an exploded perspective view of a complete speed control switch according to the present invention.

With reference now to FIG. 1, there is illustrated a complete speed control switch according to the present invention in an exploded form. A housing 2 provides a basic unit for assembling the entire speed control switch. A trigger actuator 4 fits into the upper portion of housing 2 and is held in an extreme outward position by a spring 6. A pair of lugs 8, engage with similar lugs on the inner surface of housing 2 to prevent the actuator 4 from separating from the housing. Housing 2 includes a side tubular chamber 10 which retains a spring 12 and a locking pin 14 adapted for retaining trigger actuator 4 at one of two "on" positions. Groove surfaces 16 are provided in trigger actuator 4 for engaging the locking pin 14.

A pair of bridge or wiper contacts 18 are provided for riding in a pair of slots 20 on opposite sides of trigger actuator 4. A spring 22 is provided within each of the slots 20 for forcing the contactor 18 downward. The housing 2 and trigger actuator 4 are made from a resilient plastic material.

A speed control module 24 is adapted for insertion into the lower portion of housing 2. Module 24 preferably fits snugly within housing 2 and is held in place by engagement of lugs 26 with apertures 28 in the housing 2. While the complete details of the module 24 will be better described with reference to FIGS. 2, 3, 4 and 5, the interaction of portions of the module with the actuator 4 will be specifically described at this point. In particular, a sliding resistor wiper 30 extends from the top of module 24 to engage a matching slot in the bottom of actuator 4 in a known manner. The position of wiper 30 as controlled by the actuator 4 determines the motor speed in the variable speed portion of the device operating range. Module 24 also includes mechanical switches for making electrical contact with both sides of the power supply line. One part of this switch comprises fixed contacts 32 and 34 which are retained within one half of module 24 as illustrated. Upon assembly into housing 2, one of the sliding bridge contactors 18 makes or breaks the electrical contact between the fixed contacts 32 and 34 in a known manner. Spring elements 36 are provided in module 24 so that electrical connection to the fixed contacts 32 and 34 may be made through apertures 38 in the well-known plug-in manner. In this preferred embodiment, one side of the line contact would be plugged into contact 34 while one side of the lead to the load motor would be plugged into contact 32. It is apparent that in most applications these leads could be reversed without effecting the function of the device. A similar switch arrangement on the opposite side of module 24 comprises fixed contacts 40, 42 and 44 which will be described in more detail with reference to FIGS. 2 and 5. Contact 40 is essentially identical to contacts 32 and 34 and in the preferred form has the other load motor lead connected to it. Fixed contact 42 and 44 are physically part of an electronic speed control circuit 46 which is assembled on a ceramic substrate housed between two halves of module 24. The circuitry will be described in detail with respect to FIGS. 3 and 4.

The remaining major portion of FIG. 1 comprises a reversing switch 48 which provides the well-known function of reversing the direction of the tool motor. The preferred reversing switch, which is described in detail with reference to FIG. 6, comprises a relatively thin, flat, rectangular housing adapted for mating with the top surface of housing 2. The switch 48 may be connected to the housing 2 by means of rivets 50. The switch 48 has standard plug-in connectors 52 for making the appropriate motor connections. An interlock 54 is provided for mating with the rotating portion of switch 48 and has a depending arm 56 which extends through an aperture 58 in the top of housing 2 when the device is assembled. This arm 56 interacts with a projecting ridge 60 an actuator 4 to interlock the reversing switch with the trigger actuator 4. The interlock arrangement is to prevent the change of direction of the motor at any time when power is being applied to the motor. Thus, the reversing switch may be operated only when trigger actuator 4 is in its outermost or "off" position. A particular reversing switch actuator 62 is illustrated connected to the top of switch 48. As shown the arrangement provides a reversing switch function at the rear of the speed control switch or at the back of the handle of the motor-driven tool. Other well-known actuators such as levers adapted for positioning above trigger actuator 4 are also easily adaptable to switch 48.

Figure 2:
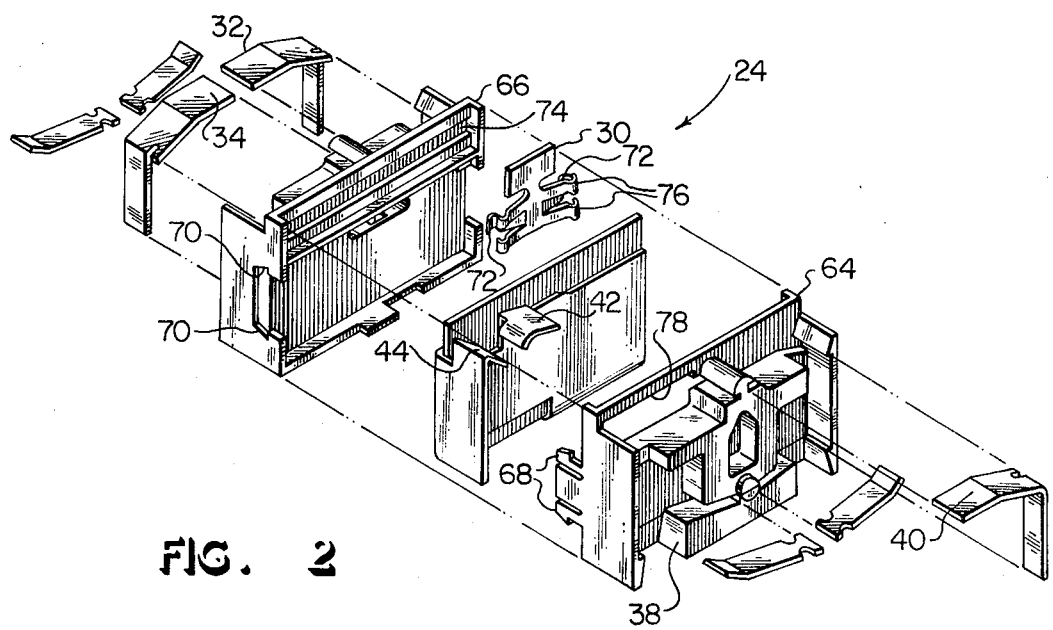
FIG. 2 is an exploded perspective view of the variable speed control module of FIG. 1.
Figure 4:
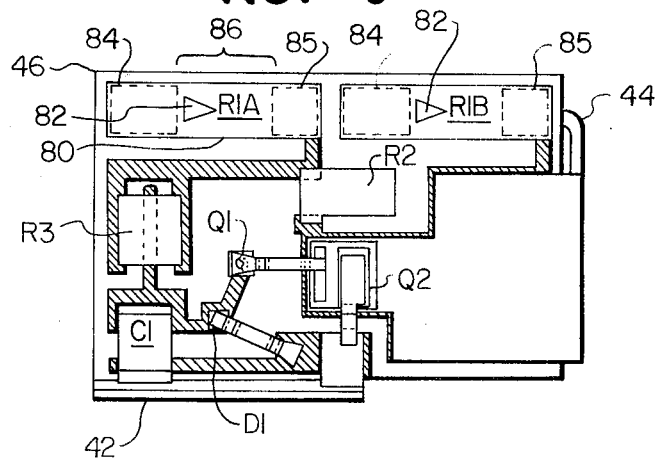
FIG. 4 is a plan view of the speed control circuitry of the present invention.

With reference now to FIG. 2 the details of speed control module 24 are illustrated in an exploded view. The designation numbers used in FIG. 1 are also used for the same parts in FIG. 2. FIG. 2 is viewed from the opposite side of module 24 to better illustrate the arrangement of contacts 40, 42 and 44. As shown in FIG. 2 module 24 is assembled primarily from two insulating sections 64 and 66 which snap together by means of interlocking elements 68 and 70. The mechanical switch contacts 32, 34 and 40 slip into appropriately shaped grooves in the outer surfaces of portions 64 and 66. The variable resistor wiper 30 has a first pair of spring arms 72 which ride in a groove 74 in section 66. Bifurcated wiper contacts 76 are provided opposite the spring arms 72 for contacting a printed resistor on control circuit 46 which is illustrated in FIG. 4. The fixed mechanical switch contacts 42 and 44 are permanently bonded to and form part of the electronic speed control circuitry 46 as illustrated. Appropriate slots such as opening 78 are provided in module half 64 so that when the circuitry 46 is sandwiched between the module halves 64 and 66 the contacts 42 and 44 extend to the outer surface of the speed control module. As illustrated, switch contact 44 has a portion extending down towards an aperture 38 for providing a plug-in contact for one of the power-line conductors.

Figure 3:
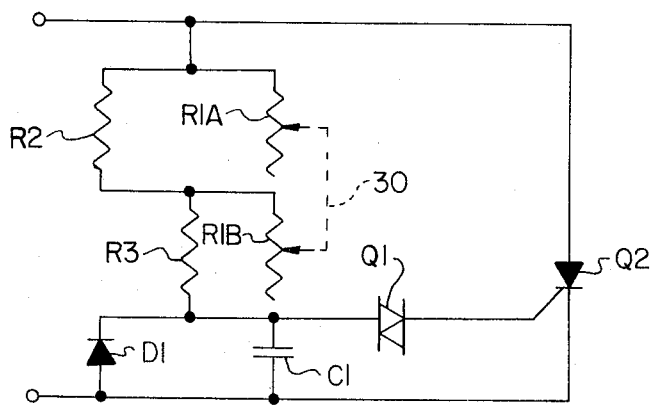
FIG. 3 is a schematic diagram of speed control circuitry according to the present invention.

With reference now to FIG. 3 the circuitry used in the preferred embodiment variable speed control is illustrated. The basic power control element in this circuit is a silicon controlled rectifier labeled Q2 which is placed in series between a power-line lead and a motor load lead. The SCR is controlled by a trigger diode Q1 which fires when a sufficient voltage is reached on a capacitor C1. Charging of capacitor C1 is controlled by a resistor network comprising variable resistors R1A and R1B and fixed resistors R2 and R3 as illustrated. In addition, a diode D1 is placed in parallel with capacitor C1 to limit the maximum voltage across the capacitor during the reverse current half of the power-line cycle. The basic functioning of this circuitry to control power is well-known to those skilled in the art. The variable resistor wiper 30 is indicated by the arrowed line in FIG. 3 and shorts out a portion of resistors R1A and R1B in accordance with the position of trigger actuator 4.

With reference to FIG. 4 now, the particular embodiment of the variable speed control circuitry FIG. 3 is illustrated. Each of the circuit components is designated by the same reference symbol used in FIG. 3. In addition, portions of fixed mechanical switch contacts 42 and 44 are also designated where they wrap around to this backside of circuit substrate 46. It can be seen, for instance, that a portion of contact 44 is soldered to the back of substrate 46 and forms a heat-sink for silicon controlled rectifier Q2. The resistors (solid areas) and conductor lines (cross hatched) making up the circuit are generated by standard silkscreening and firing techniques using known materials. But, the particular arrangement of resistors R1A and R1B has been found to provide superior results in terms of reproducability and performance of the electronic speed control circuitry. Each of these resistor strips is essentially identical and thus will be described together. Resistor R1A, for example, comprises basically a rectangular area of resistance material 80 having an opening 82 of triangular shape therein. Under the ends of the resistor 80 there are printed smaller rectangles of conductive material 84 and 85 indicated by the dotted outlines. The conductive material 84, 85 reduces the effective resistivity of the resistor material printed over it to essentially a zero valve. As a result, the actual resistor R1A comprises the printed resistance material in the region 86 lying between the metallic pads 84 and 85. As illustrated one side of the triangular aperture 82 is positioned at or near an edge of pad 84 and therefore near one end of the actual resistor R1A.

This arrangement provides a number of benefits in the present circuitry. The resistor wiper 30 provides the lowest speed of operation when it is in contact with the resistors R1A and R1B at the position of conductor pads 84. In this position the maximum resistance is in series with the capacitor C1 so the charging rate is the slowest and provides the shortest conduction period for silicon controlled rectifier Q2. The motor speed is increased by depressing the trigger actuator 4 which moves the wiper 30 to the right in FIG. 4, progressively decreasing the amount of resistance in series with capacitor C1 until a minimum amount is reached when the wiper 30 simultaneously contacts resistors R1A and R1B in the region of pads 85. As a result, continuous motor speed control is provided in the region of actuator motion measured by the length of portion 86 of resistors R1A and R1B. If the conductive pads 84 and 85 are not provided under the ends of the resistors R1A and R1B, it would become essential that the circuitry 46 be very accurately positioned relative to the housing 2 possibly in a manner described in the above-referenced U.S. Pat. No. 3,886,340. But, with the provision of pads 84 the start-up voltage which is provided when the mechanical switch contacts first close can be factory adjusted to a known reproducable value so that every unit is essentially identical.

Since pad 84 has a substantial length, it is only necessary that the alignment of circuit board 46 be sufficient so that the bifurcated contacts 76 of wiper 30 be located somewhere on pad 84 at the time the mechanical switch first closes. Further motor speed increase is then achieved when the trigger actuator is depressed sufficiently to move the wiper 30 off of pad 84 and into the region 86 of resistors R1. In similar fashion, pads 85 provide a dead zone near the upper end of the variable speed portion of the motor control circuit. That is, when the contacts 76 reach the edge of pads 85 the speed control circuit 46 provides approximately one half of full-line voltage to the motor and maintains this same output at any position of the contacts on pads 85. Further speed increase is achieved when actuator 4 is fully depressed to make the final mechanical switch contact which bypasses the circuit 46 and provides full-line voltage to the motor. This mechanical contact can be made anywhere in the region of actuator 4 motion corresponding to the width of pad 85 and proper operation will result.

It is important that the resistor material from which resistors R1A and R1B are formed be printed over pads 84 and 85. While some prior designs have printed conductor material on top of the resistor material, this can greatly shorten the lifetime of the device. If the wiper contacts 76 slide from a metallic contact onto a resistive contact they tend to smear some of the metallic material across the top of the resistive material. This smeared metal can reduce the resistance or completely shortout the resistor and thereby change the circuit operation.

The apertures 82 in resistors R1A and R1B insure that the factory adjusted initial output voltage of the variable speed control electronics corresponds very closely to the actual speed achieved when the device is assembled with resistance wiper 30. The initial output voltage of circuit 46 is factory adjusted by using probes to short circuit pads 84 and supplying power to circuit while trimming resistor R2 until a desired initial voltage is reached. It can be seen that the pads 84 provide in effect a good metallic line contact to the resistors R1A and R1B along a line adjacent to triangular apertures 82. The same effect is achieved when wiper 30 is positioned over pads 84. But, when wiper 30 is moved off of pads 84 and into the regions 86, the contacts 76 take the form of point contacts which provide effectively higher resistance than a continuous line contact. If apertures 82 were not present, the effective resistance of resistors R1A and R1B would increase as the wiper 30 left the region of pads 84 instead of decreasing as is desired. Apertures 82 in effect simulate the point contact effect of wiper 30 so the resistance measured from pads 84 is essentially the same as that measured from the wiper contacts when they are positioned near the left end of area 86. As a result the apertures 82 provide a smooth transition from the initial voltage provided by contact with pads 84 through an increasing voltage achieved in the region 86 to the maximum voltage achieved when contacts are over pads 85. As a result, this overall resistor arrangement provides speed control circuits which may be mass produced without variation in the operating performance of the units. The variable resistors R1A and R1B are in fact very nearly linear. It will be appreciated that in the circuit of FIG. 3, the fact that the variable resistors are in parallel with fixed resistor R2 results in some allowable non-linearity of operation.

Figure 5:
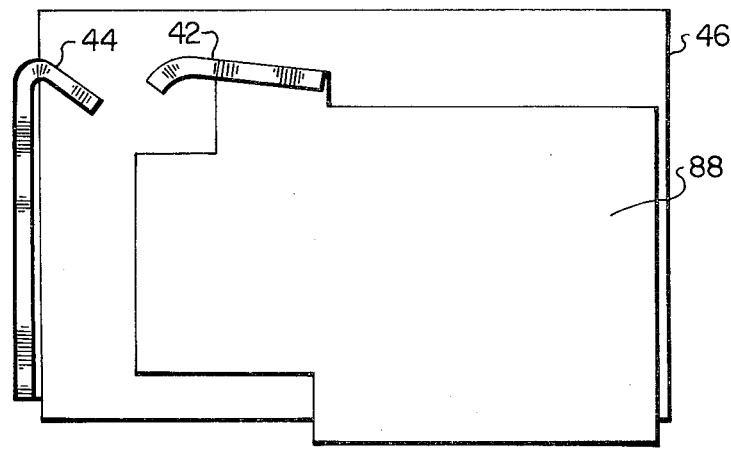
FIG. 5 is a plan view of the back of the circuitry of FIG. 4 showing the arrangement of two fixed mechanical switch contacts.

With reference now to FIG. 5, there is illustrated the backside of the electronic circuit substrate 46. Again the fixed switch contacts 42 and 44 are illustrated in plan view showing their positions relative to the substrate 46. The fixed switch contact 42 has a large flat surface 88 which is soldered to the backside of substrate 46. This arrangement provides good mechanical support for contact 42 and in addition, provides additional heat-sink area for silicon controlled rectifier Q2 mounted on the front face of substrate 46. It can be seen that the flat area 88 of contact 42 overlaps the portion of contact 44 on which the rectifier Q2 is mounted.

Figure 6:
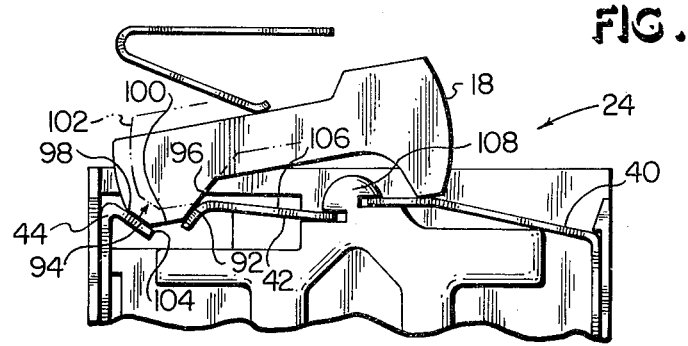
FIG. 6 is an illustration of the relationship of a bridging contactor and fixed contacts according to the present invention.

With reference now to FIG. 6, there is illustrated a plan view of one side of speed control module 24 again showing the relationship of contacts 40, 42 and 44 and the details of engagement of bridge contactor 18 with contacts 42 and 44. Contactor 18 is shown in the full-speed position in which it is simultaneously contacting both fixed contacts 42 and 44. In this illustration it can be seen that the fixed contacts 42 and 44 each have essentially flat contact faces 92 and 94 sloping down and towards each other. It can also be seen that the intersection of the planes of these two contact surfaces 92 and 94 are approximately 90°. In the preferred embodiment contact surface 94 slopes at approximately 35° below the horizontal plane. Larger angles of slope up to 45° were thought to be desirable but were in practice found to cause the application of excessive force to contact 44 upon full depression of actuator 4. In the preferred form, bridge contactor 18 has flat contact surfaces 96 and 98 corresponding to the contact surfaces 92 and 94 respectively so that tangential contact may be made simultaneously to both contacts 42 and 44. A third flat contact surface 100 is located between the contact surfaces 96 and 98 on bridge contactor 18. A dotted line illustration 102 of the bridge contactor 18 illustrates its position at a speed below the full speed position shown by the solid line version of contactor 18 in FIG. 6. It can be seen by comparison of the two positions that the breaking of the contact between surfaces 94 and 98 occurs in a direction essentially normal to the two surfaces. In addition the contact is broken at a position on fixed contact 44 spaced from the corner 104 forming one edge of contact 44. These factors are believed to be responsible for the reduction in arcing damage in this type of switch. While in general this is a sliding contact switch, the breaking of a sliding contact from an edge, such as edge 104, would tend to generate a strong arc from the sharp corner. It is also desirable that the breaking be done as rapidly as possible. The arrangement as illustrated has been found to provide approximately 1.4 units of separation between contact surfaces 94 and 98 for each unit of linear travel of actuator 4 as it is released.

In tests comparing this arrangement to switches similar to those illustrated in the above-referenced U.S. Pat. No. 3,886,340 which have an essentially flat full-speed contact, the arrangement disclosed herein has been found far superior. While as noted above, the prior devices typically fail after ten to fifteen thousand cycles of operation, four units as herein described were tested to 101,000 cycles of operation without a failure. Testing was discontinued at that point due to failure of bearings in the load devices which were commercial routers.

Further study of FIG. 6 shows several additional advantages. While as noted above contact surfaces 94 and 98 make and break contact in an essentially normal direction, full depression of actuator 4 causes surface 98 to slide up surface 94, thus, providing the self-cleaning sliding contact which is desirable. While the present arrangement reduces arcing to an acceptable level, it can be anticipated that surface 98 will suffer some arcing damage which tends to roughen the surface. If this rough surface is then allowed to slide across the contact faces of contact 42, it can cause damage at that point. It can be seen that the arrangement provided herein does not allow any contact face on bridging contactor 18 which makes contact with fixed contact 44 to ever touch any part of fixed contact 42. As the actuator 4 is released to move contactor 18 to the right in FIG. 6, for example to position 102, the contact face 96 slides up the sloped contact surface 92. Further release of the actuator 4 brings the contact surface 100 into contact with a second flat surface 106 of fixed contact 44. It is this flat contact 100 which makes and breaks contact with surface 106 at the low speed end of the operating range as surface 96 engages the insulating camming projection 108 in a conventional manner.

In the preferred form, essentially flat contact faces are provided on bridge contactor 18. It will be appreciated by those skilled in the art, that a smooth continuous curve could be provided in the region of contact faces 96, 98 and 100 which would provide tangential contact simultaneously with contact faces 92 and 94 of fixed contacts 42 and 44 respectively. The flat surfaces on contactor 18 reduce current density at the points of contact which reduces heating and prolongs contact life. However, it can be seen that the arc reduction benefits achieved by the direction of motion in making and breaking the full power contact could also be achieved with the continuous curve type contact.

Figure 7:
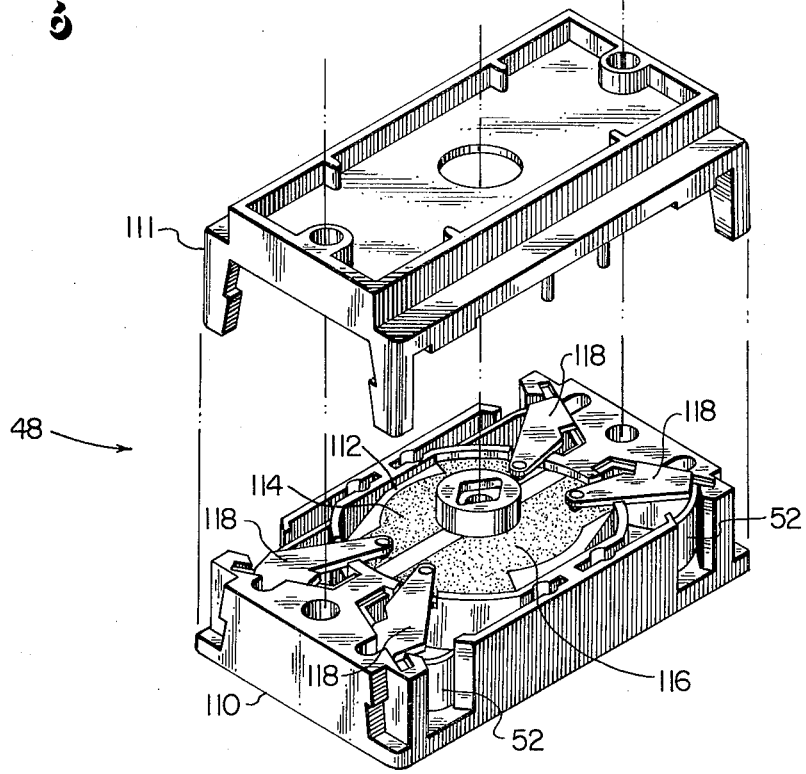
FIG. 7 is an exploded view of the reversing switch of FIG. 1.

With reference now to FIG. 7, there is illustrated a preferred reversing switch according to the present invention. The exploded view of FIG. 7 is shown from the bottom relative to the view of the assembled switch 48 shown in FIG. 1. The switch 48 primarily comprises a two-piece plastic case comprising a bottom part 110 and a top part 111 as illustrated FIG. 7. The lower portion 110 holds a rotating switch contact portion 112 having two metallic strips 114 and 116 imbedded therein. In addition, four fixed contacts 118 are positioned at approximately the four corners of the case 110. It can be seen that the case 110 has a generally circular opening which has two flat sides on it provided for holding the rotating portion 112. The rotor portion 112 is also generally circular but has four flat surfaces which interact with the opening in casing 110 to hold the rotor 112 in either of two switch positions. The case 110 and the rotor 112 are made of plastic having sufficient resiliency to allow the rotor to snap from one position to the other by flexing the plastic parts. It can be seen that the four contacts 118 are arranged to conveniently receive by means of conventional plug-in recepticals 52 appropriate motor leads to provide a reversing function to the tool motor. This switch arrangement is preferred due to its simplicity compared to the prior devices and its essentially flat structure which adapts quite well to the speed control housing 2. The top and bottom portions 111 and 110 of the switch casing are provided with interlocking ridges and grooves so that these portions may conveniently and easily be snapped together after the various switch parts have been assembled into the casing half 110.

It can be seen that the entire speed control switch, as above described, is adapted for fitting into hand power tools in a conventional manner. The preferred embodiment is in fact a direct replacement for many other commercial parts. The device is connected between the supply line and the motor load as indicated above and controls motor speed in a conventional manner. The above described half-wave control electronics provide a variable speed range from essentially zero to one half of full speed. The mechanical switch then provides a full power and speed output from the motor. It is, of course, a simple matter to provide modified electronic circuitry 46 for providing variable speed control over the entire range of zero to full power. The circuitry for this purpose is well-known but is not used in a preferred embodiment because it requires a larger number of components and the use of more expensive components. A substrate 46 having such circuitry on it may physically be substituted into the speed control module 24 illustrated herein. With either circuit in the speed control unit, motor output speed is controlled in proportion to the position to which the trigger actuator 4 is depressed into housing 2. The improved variable resistor taught herein is useful in the full range control also.

While the present invention has been illustrated and described in terms of specific apparatus, it is apparent that numerous other changes and modifications can be made within the scope of the present invention as defined by the appended claims.

We claim:

1. In a compact electronic speed control for controlling the speed of a portable tool, of the type having a housing into which an actuator in reciprocally movable for selecting tool speed, said housing carrier electronic speed control circuitry of the half wave type operatively coupled to said actuator, and further carries mechanical switching means operatively coupled to said actuator for connecting power to said circuitry at a first actuator position and connecting power directly to said tool at a second actuator position, an improved mechanical switch comprising:

first, second and third stationary contacts and a first bridge contact operatively coupled to said acutator to move therewith, said first contact adapted for connection to a terminal of said tool and having a substantially flat surface on which a first end of said first bridge contact rides, said second contact connected to an output of said circuitry and said third contact connected to a power line lead, said second and third contacts having spaced apart contact surfaces sloped with respect to the direction of movement of said actuator, the intersection of the planes of said sloped contact surfaces forming an angle near 90°, and said first bridge contact having a second end for contacting said second and third stationary contacts, said second end having at least first and second contact surfaces for tangentially contacting the sloped surfaces of said second and third contacts at an intermediate actuator position and thereby adapted for making and breaking contact with said third contact in a direction approximately normal to said sloped surface of said third contact, said third contact further having a length sufficient that said bridge contact breaks contact with said third contact at a point spaced from the edges of said sloped surface.

2. The improved electronic speed control of claim 1 further including a second mechanical switch comprising:

fourth and fifth stationary contacts and a second bridge contact operatively coupled to said actuator to move therewith in parallel with said first bridge contact, said fourth contact connected to another terminal of said tool motor and having a substantially flat surface on which a first end of said second bridge contact rides, and said fifth contact connected to another power line lead and having a substantially flat surface on which a second end of said second bridge contact makes and breaks contact and slides after making contact.

3. In an electronic speed control according to claim 1, of the type wherein said circuitry in coupled to said actuator by means of a variable resistor wiper mechanically coupled to said actuator to move therewith and electrically contacting a printed strip resistor:

an improved printed strip resistor comprising a generally rectangular strip of resistance material deposited on a substrate and generally rectangular first and second conductor pads deposited on said substrate beneath each end of said resistance, said resistor positioned on said substrate such that said wiper contacts said resistor at a point over the first conductor pad at said first actuator position and said wiper contacts said resistor at a point over the second conductor pad at said second actuator position.

4. In an electronic speed control according to claim 3 wherein said resistor wiper has bifurcated contact surfaces for contacting said printed strip resistor;

the further improvement comprising a triangular window in said printed strip resistor adjacent said first conductor pad, whereby the resistance of said resistor measured from said first pad in substantially the same as that measured by contact with said wiper immediately adjacent said first pad.

5. The improved electronic speed control of claim 1 further including a reversing switch operatively coupled to said housing and said actuator to allow the direction of motion of said tool to be reversed when said actuator is in an off position, said reversing switch comprising:

generally rectangular bottom and top portions having interlocking flanges on each end for snapping together to form a second housing, said bottom portion having a chamber with two opposed circular arc sides and two opposed straight sides, an armature carried within said chamber, said armature comprising a generally disc shaped insulator having opposed circular arc sides corresponding to the chamber arc sides, and having two pairs of opposed straight sides adapted to alternately fit against said chamber straight sides, two conductor strips carried on a first side of said armature, first, second, third and fourth fixed contacts carried by said bottom portion each having a contact surface touching the first side of said armature, said conductor strips and said fixed contacts positioned to connect said first and second fixed contacts together and said third and fourth fixed contacts together in a first armature position, and to connect said first and fourth fixed contacts together and said second and third fixed contacts together in a second armature position, means for connecting electrical leads to said fixed contacts, means for rotating said armature between said first and second positions, and interlock means coupled to said actuator for preventing rotation of said armature when said actuator is depressed.

6. In a compact electronic speed control for controlling the speed of a motor in a portable tool of the type having a housing into which an actuator is reciprocally movable for selecting tool speed, said housing carrying electronic circuitry operatively coupled to said actuator by means of a bridging contactor which makes sliding contact to at least one printed resistance strip, said bridging contactor having bifurcated ends forming a pair of substantially point contacts at each end:

an improved printed resistance strip comprising a generally rectangular strip of resistance material deposited on a substrate, generally rectangular conductor pads deposited on said substrate beneath each end of said resistance strip, and a triangular window in the resistance strip near one of said conductor pads whereby a point electrical contact to one of said conductor pads simulates contact to said resistance strip at a point adjacent said one conductor pad by said bifurcated bridging contactor.

7. In electronic speed control apparatus according to claim 6 wherein said bridging contactor makes sliding contact to a pair of printed resistance strips:

the improvement comprising a second improved printed resistance strip according to claim 6, simultaneously contacted by said bridging contactor.

8. In a compact electronic speed control for controlling the speed of a motor in response to movement of a trigger actuator of the type wherein a first motor speed is provided at a first actuator position, a second motor speed is provided at a second actuator position, intermediate motor speeds are provided at at least a portion of intermediate actuator positions, said motor speed is proportional to the location of a sliding contact on a printed resistance strip, and said sliding contact is coupled to said actuator to move therewith, an improved printed resistance strip comprising a generally rectangular strip of resistance material deposited on a substrate and generally rectangular first and second conductor pads deposited on said substrate beneath the ends of said resistance strip, said resistance strip having a length corresponding to the distance between said first and second actuator positions and said conductor pads positioned so that said sliding contact contacts said resistance strip over said first conductor pad at said first actuator position and over said second conductor pad at said second actuator position.

9. The electronic speed control of claim 8 wherein said sliding contact has a bifurcated end for contacting said printed resistance strip;

the further improvement comprising a triangular window in said resistance strip having one edge adjacent one of said conductor pads whereby an electrical contact to said resistance strip over said one pad simulates contact by said sliding contact at a point adjacent said one conductor pad.

10. In a trigger actuated electric switch for providing a first voltage at a first actuator position and a second voltage at a second actuator position, an improved contact arrangement comprising:

first, second and third stationary contacts, and a conductive bridge contact coupled to said actuator to move therewith, said first contact having a substantially flat surface, said bridge contact having a first end in sliding contact with said first contact, said second and third contacts spaced from said first contact so that a second end of said bridge contact touches said second contact at said first actuator position and touches said third contact at said second actuator position, said second and third contacts having surfaces sloped with respect to the direction of movement of said actuator and sloped at about 90° with respect to each other, said bridge contact second end having at least first and second surfaces for simultaneously tangentially touching said sloped surfaces of said second and third contacts at an intermediate actuator position, whereby upon reciprocation of said actuator said bridge contact second end makes and breaks contact with said second and third stationary contacts in a direction about normal to said sloped surfaces.

11. The trigger actuated switch of claim 10, wherein said sloped surfaces of said second and third stationary contacts have a length sufficient that said bridge contact breaks contact with said sloped surfaces at points spaced from edges of said second and third contacts.

* * * * *